(12) United States Patent
Kuehnle

(10) Patent No.: US 9,328,777 B2
(45) Date of Patent: May 3, 2016

(54) CLUTCH AND CORRESPONDING MOTOR VEHICLE

(71) Applicant: Schaeffler Technologies GmbH & Co. KG, Herzogenaurach (DE)

(72) Inventor: Michael Kuehnle, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 64 days.

(21) Appl. No.: 14/277,926

(22) Filed: May 15, 2014

(65) Prior Publication Data

US 2014/0332338 A1 Nov. 13, 2014

(30) Foreign Application Priority Data

May 13, 2013 (DE) .......................... 10 2013 208 663

(51) Int. Cl.
*F16D 25/062* (2006.01)
*F16D 25/12* (2006.01)
*F16D 13/72* (2006.01)

(52) U.S. Cl.
CPC ............ *F16D 25/062* (2013.01); *F16D 25/123* (2013.01); *F16D 13/72* (2013.01); *F16D 2300/0214* (2013.01)

(58) Field of Classification Search
CPC ................ F16D 25/062; F16D 25/063; F16D 2300/0214
USPC .......................................... 192/85.25, 106 F
See application file for complete search history.

(56) References Cited

U.S. PATENT DOCUMENTS

| | | | | | |
|---|---|---|---|---|---|
| 6,978,874 | B2 * | 12/2005 | Miyoshi | ................ | F16D 25/123 192/113.3 |
| 7,001,298 | B2 * | 2/2006 | Biermann | ............... | F16D 25/14 192/113.36 |
| 7,841,458 | B2 * | 11/2010 | Schneidewind | .... | F16D 25/0638 192/106 F |

* cited by examiner

*Primary Examiner* — Richard Lorence
(74) *Attorney, Agent, or Firm* — Davidson, Davidson & Kappel, LLC

(57) ABSTRACT

A clutch, in particular for a motor vehicle, for transmitting torque from an input shaft to an output shaft, includes a wet chamber which is at least partially filled with a cooling medium, and at least one piston, the piston and a component located opposite the piston being rotatable around an axis, and the piston being movable in the direction of the axis to disengage and engage the clutch, is characterized in that on at least one of the following elements:
a) the piston and
b) the component located opposite the piston
on a side facing the other element, at least one web is formed, which extends in the direction of the axis in the direction of the other component, and whose path has at least one radial part in reference to the axis.

6 Claims, 5 Drawing Sheets

CLUTCH AND CORRESPONDING MOTOR VEHICLE

This claims the benefit of German Patent Application DE 10 2013 208 663.6, filed May 13, 2013 and hereby incorporated by reference herein.

The present invention relates to a clutch, in particular for a motor vehicle, and to a corresponding motor vehicle.

BACKGROUND

In wet clutches operated by a piston, for example for motor vehicles, problems arise again and again with the difference in centrifugal oil pressure and with equalizing it, which stems from different speeds of rotation and resulting dynamic pressures of rotation in the pressure chamber of the piston on the one hand and outside of the piston on the other hand. In order to also protect other components of the clutch here, if necessary, from the correspondingly accelerated cooling medium (oil), centrifugal oil hoods are often used. That requires a larger number of parts and a higher installation cost. Furthermore, the lack of centrifugal oil pressure equalization often causes problems in the ability to control the operation of the clutch.

SUMMARY OF THE INVENTION

It is an object of the present invention is to at least partially overcome the disadvantages known from the existing art.

The present invention provides a clutch, in particular for a motor vehicle, for transmitting torque from an input shaft to an output shaft, includes a wet chamber which is at least partially filled with a cooling medium, and at least one piston, the piston and a component located opposite the piston being rotatable around an axis, and the piston being movable in the direction of the axis so as to disengage and engage the clutch, is characterized in that on at least one of the following elements:
a) the piston and
b) the component located opposite the piston
on a side facing the other element at least one web is formed, which extends in the direction of the axis in the direction of the other component, and whose path has at least one radial part in reference to the axis.

The clutch employed here may be a wet clutch, such as in particular friction clutches, converter clutches, dual clutches, starting clutches and power shift clutches. Here, a cooling medium means in particular a cooling fluid, for example an oil, in particular a fully synthetic and/or partially synthetic oil and/or a mineral oil, with which the wet chamber is at least partially filled and by which the heat which is created during operation of the clutch, in particular during engaging and disengaging, can be absorbed and dissipated, in order to ensure that the clutch engages reliably without slipping, even after multiple or many actuating processes. The clutch is a clutch which is actuated using a piston, that is, which is actuated in particular by a hydraulic disengaging mechanism. Actuating the clutch means in general disengaging or engaging the clutch; that is, when disengaging, a transition from a state in which torque is transmitted by the clutch to a state in which essentially no torque is transmitted, and the opposite when engaging the clutch. When a friction clutch is used as the clutch, this is a process of engagement when closing the clutch and a process of disengagement when opening the clutch. The component located opposite is, for example, the clutch housing.

The piston has a pressure chamber, which is formed opposite the piston in reference to the component. Thus the piston is located between the component and the pressure chamber. A hydraulic medium is present in this pressure chamber, in particular an oil, such as a synthetic and/or partially synthetic oil and/or a mineral oil. By changing the pressure in the pressure chamber, the piston can be moved in the direction of the axis toward the component or away from it, in order to disengage or engage the clutch thereby.

Through the formation of the at least one web, which extends toward the component located opposite, the space between the elements is divided into oil chambers. The formation of a plurality of webs is preferred. The webs have a course having at least one radial portion; preferably, they run radially. A course having at least one radial portion means that the at least one web cannot run completely in a circumferential direction, i.e., that they cannot be designed in the form of a circular ring around the axis.

The formation of the at least one web having at least one radial portion results in acceleration of the cooling medium in the oil chambers during operation. Consequently, when there are differences in speed of rotation between the piston and the adjacent component, the dynamic pressure difference between the pressure chamber and the region between component and piston is reduced. This improves the controllability of the clutch. Furthermore, the at least one web also provides for conveyance of the cooling medium in the wet chamber, whereby the cooling capacity is increased.

According to one advantageous form of the clutch, both the piston and the component located opposite each have at least one web, which overlap each other in the axial direction.

Overlapping means in this connection in particular that in the axial direction a region exists in which opposing webs are located next to each other, and are separated only by a gap whose dimension in the radial direction is significantly smaller than the interval between two adjacent webs on one element. A normal gap in the interval between two webs in the circumferential direction may be in the range of 0.05-1 mm. This has proven to be advantageous, since a good seal is ensured while at the same time compensating for fabrication-based tolerances.

A configuration having overlapping webs is advantageous, if, due to the design, both the piston and the component located opposite rotate with an identical rotational frequency. In such a case, global circulation of the cooling medium in the wet chamber, which is usually desired for cooling purposes to dissipate heat from the friction linings or areas, results in a difference in centrifugal oil pressure between the pressure chamber and the region located outside between the piston and the component. The overlap results in the formation of essentially tightly sealed oil chambers, which are sealed in the area of the overlap in the manner of a labyrinth seal. Oil chambers of this sort are especially effective.

According to one advantageous form of the clutch, the at least one web is designed so that a gap remains in the axial direction relative to the respective other element.

This makes it possible to design a clutch in which the piston and the opposing component may rotate at different rotational frequencies, wherein for example the piston has a rotationally fixed connection with the input shaft and the opposing component has a rotationally fixed connection with an output shaft. Because of the design having at least one web only on the piston or only on the opposing component, the difference in speed of rotation can thus not result in a tilting of opposing webs. The design with a gap enables a relative motion between piston and opposing component, where the gap is dimensioned so that the tightness of seal, and thus the acceleration effect, is still sufficiently great to adapt the centrifugal oil pressure. Gap measurements of preferably 0.5-3 mm have proven to be especially advantageous, since they allow movement of the piston and, at the same time, still enable adequate sealing.

According to one advantageous form of the clutch, the clutch is configured such that the piston and the opposing component are operated with an identical rotational frequency during operation.

An equalization of centrifugal oil pressure is necessary in such a situation; in particular if a global circulation of cooling medium in the wet chamber is required. In this case, the design having webs can be utilized in an advantageous manner, including in particular having webs both on the piston and on the component located opposite the piston.

According to one advantageous form of the clutch, the clutch is configured such that the piston and the opposing component may be operated with a difference in rotational speed during operation.

The difference in rotational speed is present in particular when engaging and disengaging, or possibly when in neutral. The clutch according to the invention is particularly advantageous when engaging and disengaging, since here the pump effect of the at least one web, preferably of a plurality of webs, can serve advantageously to dissipate the frictional heat when engaging and disengaging. In addition, the clutch according to the invention may be utilized effectively when equalizing the centrifugal oil pressure.

According to another aspect, a motor vehicle is proposed having a drive unit with an output shaft, a drivetrain and a friction clutch as described here, to connect the output shaft to the drivetrain detachably. Preferably, the drive unit is situated in the motor vehicle ahead of a driver's compartment and transversely to a longitudinal axis of the motor vehicle.

Most motor vehicles today have front wheel drive, and therefore by preference position the drive unit, for example an internal combustion engine or an electric motor, in front of the driver's compartment and transversely to the main direction of travel. The construction space in such an arrangement is especially tight, and it is therefore particularly advantageous to use a clutch of smaller size.

The construction space situation becomes more critical in the case of small-class passenger cars according to European classification. The assemblies used in a small-class passenger car are not significantly smaller compared to larger-class passenger cars. Nevertheless, the available construction space is significantly smaller in small cars. The adjusting device or friction clutch described above is particularly advantageous for small cars, because the total size is small and, at the same time, an extremely reliable adjustment is achieved. Passenger cars are classified in a vehicle class according to, for example, size, price, weight, power, this definition being subject to constant change according to the needs of the market. In the US market, vehicles of the small car and smallest car class according to European classification are classified as subcompact cars, and in the British market they correspond to the class of super minis, for example, the city car class. Examples of the smallest car class are a Volkswagen Fox or a Renault Twingo. Examples of the small car class are an Alfa Romeo Mito, Volkswagen Polo, Ford Fiesta or Renault Clio.

The features listed individually in the patent claims can be combined with each other in any technologically reasonable way, and can be supplemented by explanatory facts from the description and details from the figures, in which case additional variant embodiments of the invention will be shown.

BRIEF DESCRIPTION OF THE DRAWINGS

The invention as well as the technical environment will be explained in greater detail below on the basis of the figures. The figures show especially preferred exemplary embodiments, to which the invention is not limited, however. In particular, it must be pointed out that the figures, and especially the depicted size proportions, are only schematic. The figures show the following.

DETAILED DESCRIPTION

Figure 1:
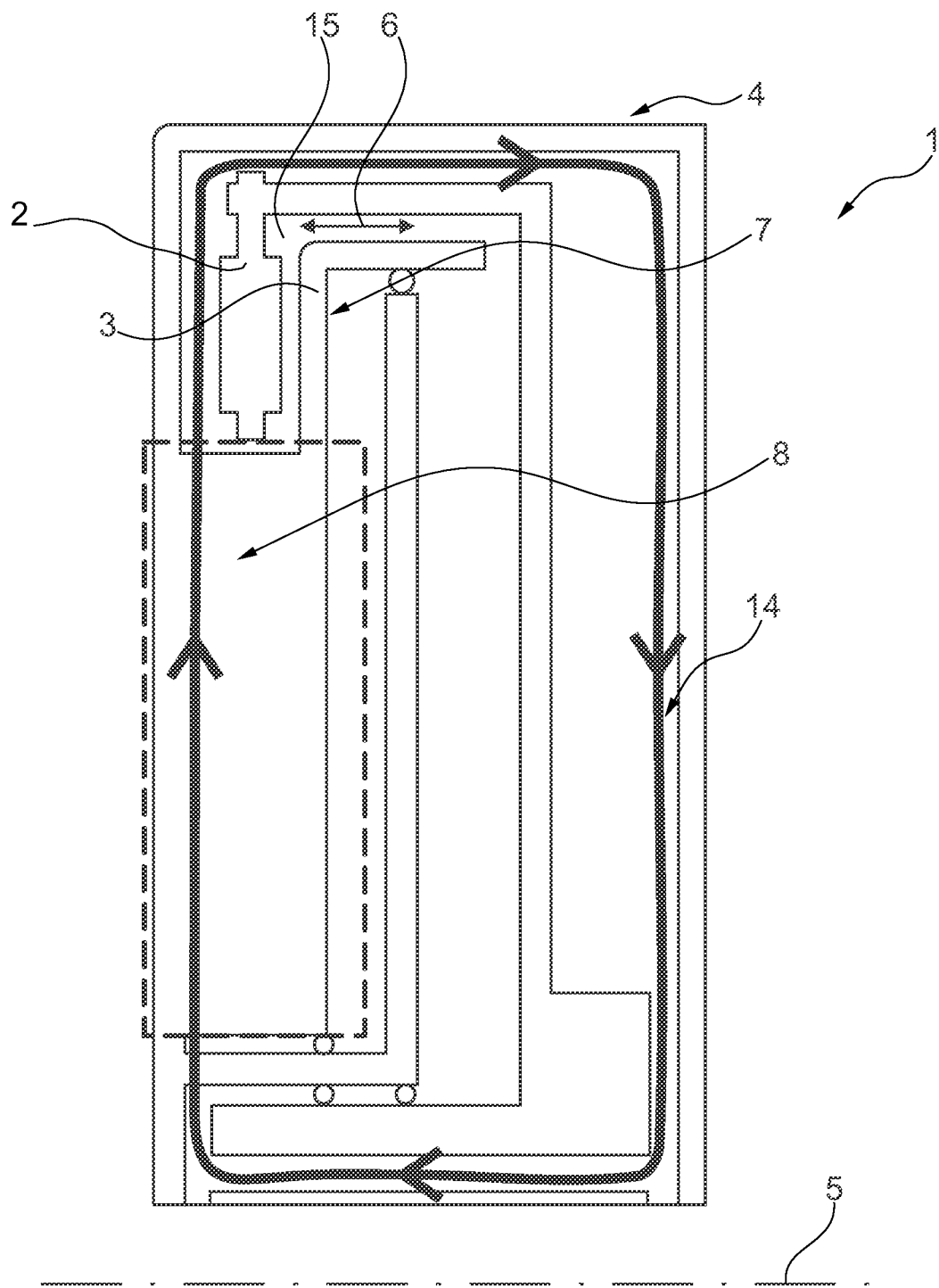
FIG. 1: a first example of a clutch.

FIG. 1 shows a partial schematic view of a wet clutch 1, which is designed in this example as a friction clutch having frictional elements 2. The clutch 1 has a piston 3, which may rotate together with a housing 4 around an axis 5. To this end, the housing 4 and the piston 3 are connected to a shaft in a rotationally fixed connection. Torque is transmissible through the clutch 1 between the components marked in black and the components marked in gray. Depending on the operating state of a drive unit driving an input shaft and the driven drivetrain, and depending on the operating state of the clutch 1, that is, whether the latter is disengaged and no torque is being transmitted or engaged for the transmission of torque, the input shaft and output shaft, and thus also the black and gray marked components, may have different speeds of rotation, which are matched when the clutch 1 is closed (engaged).

Figure 2:
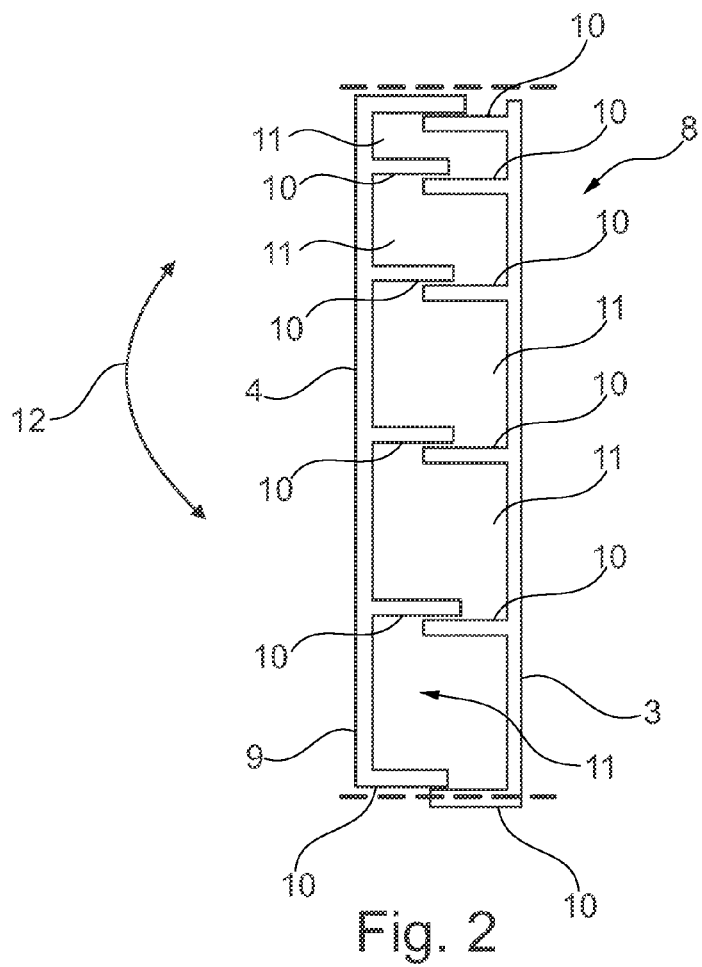
FIGS. 2-4: different examples of one form of the example of a clutch.
Figure 3:
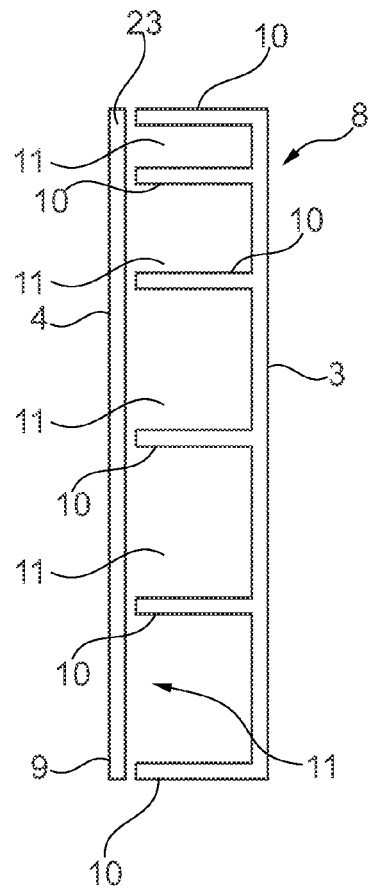
Figure 4:
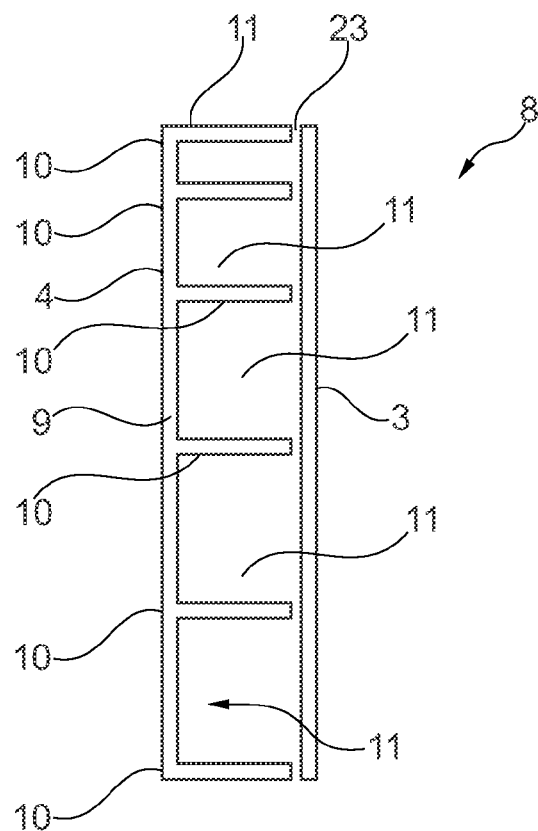

To actuate the clutch 1, the piston 3 is moved in the direction of the axis 5, as indicated by the arrows 6, so that a frictional connection is produced between the piston 3 and the frictional element 2. To this end, the pressure is raised in a pressure chamber 7 of the piston 3, which is filled with a hydraulic medium, for example an oil, in particular a synthetic, partially synthetic and/or mineral oil. Through the rotation of the piston 3, centrifugal forces act on the hydraulic medium in the pressure chamber 7. The region 8 in FIG. 1 is shown in FIGS. 2 through 4 for various cases, in which a component 9, which is the housing 4 here, is located opposite the piston 3, and both are connected to an identical shaft in a rotationally fixed connection, so that there is no difference in speed of rotation between piston 3 and component 9. Because there is no difference in speed of rotation between piston 3 and component 9, no equalization of centrifugal oil pressure should be necessary. It has been found, however, that in the case of a global cooling medium flow 14 in the wet chamber 15 the cooling medium must also be accelerated in the circumferential direction 12, which usually succeeds only to an insufficient degree, so that there are differing pressure circumstances in the pressure chamber 7 of the piston 3 and between piston 3 and component 9. Differing dynamic pressure circumstances between the pressure chamber 7 of the piston 3 and the space between the piston 3 and the component 9 always result in poor controllability of the clutch 1.

FIGS. 2 through 4 show radial views of the region 8. In FIG. 2, the piston 2 and the housing 4 are formed as component 9, which is located opposite the piston 3. That means that the pressure chamber 7 of the piston 3 is formed on the side of the piston 3 facing away from the component 9. Both the piston 3 and the housing 4 here have a plurality of webs 10, which extend in the direction of the axis 5 in the direction toward the respective other element. For the sake of clarity, only part of the webs 10 in FIGS. 2 through 5 are provided with reference labels. The webs 10 are shaped so that they overlap in the direction of the axis 5. The degree of overlapping depends on the position of the piston 3. A configuration is preferred in which in normal operation of the clutch 1 there is an overlap at every axial position of the piston 3.

Figure 5:
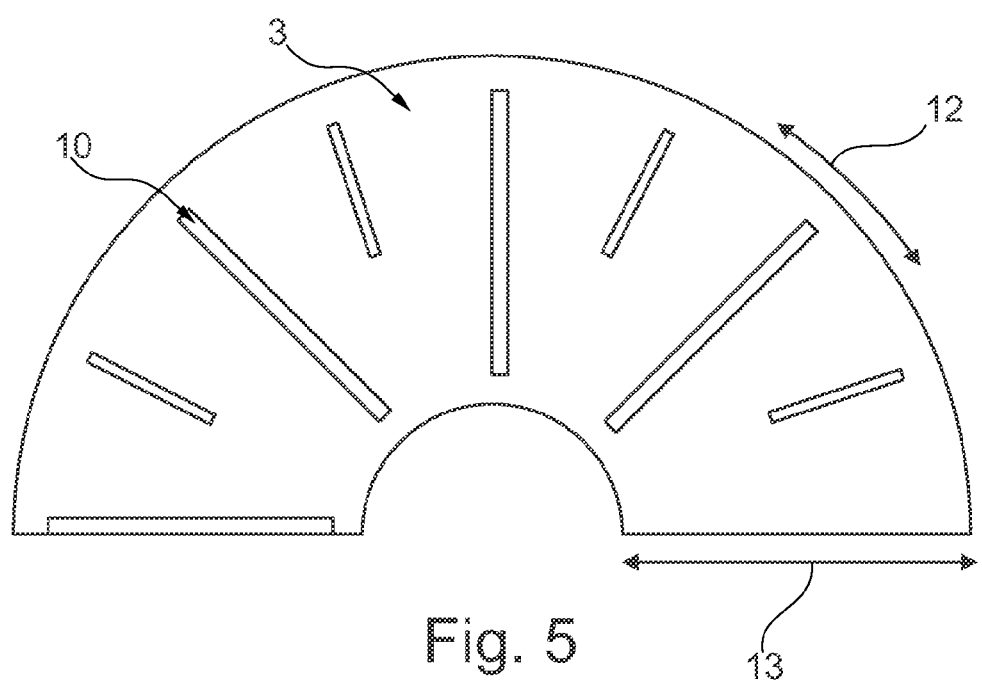
FIG. 5: an exemplary depiction of the corresponding webs.

Oil chambers 11 are formed by the overlapping webs 10. FIG. 5 shows the radial path of the webs 10. While flowing in a radial direction is possible, flowing of the cooling medium in circumferential direction 12 is largely prevented by the webs 10. Any creeping flows through the labyrinth-type seal which is formed by the overlapping webs can usually be ignored. The formation of the oil chambers 10 causes a rotation and acceleration of the cooling medium in the space between the piston 3 and the component 9, so that largely identical flow conditions and identical pressure conditions exist in reference to the dynamic pressure between pressure chamber 7 and the space between component 9 and piston 3, that is, the oil chambers 11. That practically eliminates the influence of the centrifugal oil pressure on the controllability of the clutch, without the need of utilizing an additional centrifugal oil hood, for example. In addition, the rotation the oil chambers 11 also results in a conveyance of the cooling medium through the wet chamber 15, which can be used to improve the cooling of the clutch 1.

FIG. 3 shows an alternative configuration, likewise in radial view, wherein webs 10 are formed only on the piston 3. Because of the absence of overlapping of the webs 10, gaps 23 are formed between the web 10 and the component 9. It has been found that with such a variant as well there is a significant adaptation of the dynamic pressures of the cooling medium between piston 3 and component 9 and of the hydraulic medium in pressure chamber 7, enabling the controllability of the clutch 1 to be improved here too.

FIG. 4 shows another example in radial view, wherein the webs 10 are formed only on the component 9. This possible variant represents a modification of the intermeshing principle, which was described previously and which is easier to realize in terms of tolerance technology.

FIG. 5 shows a top view of the piston 3 in the direction of the axis 5. This view shows that the webs 10 run in the radial direction 13. The webs 10 may also be shaped differently, but must have at least one radial portion. That means in particular that the webs 10 must not form any circular rings formed around the axis 5. The webs 10 on the component 9 can be designed accordingly. To define certain flow profiles, the webs 10 may have different lengths in the radial direction 13.

Figure 6:
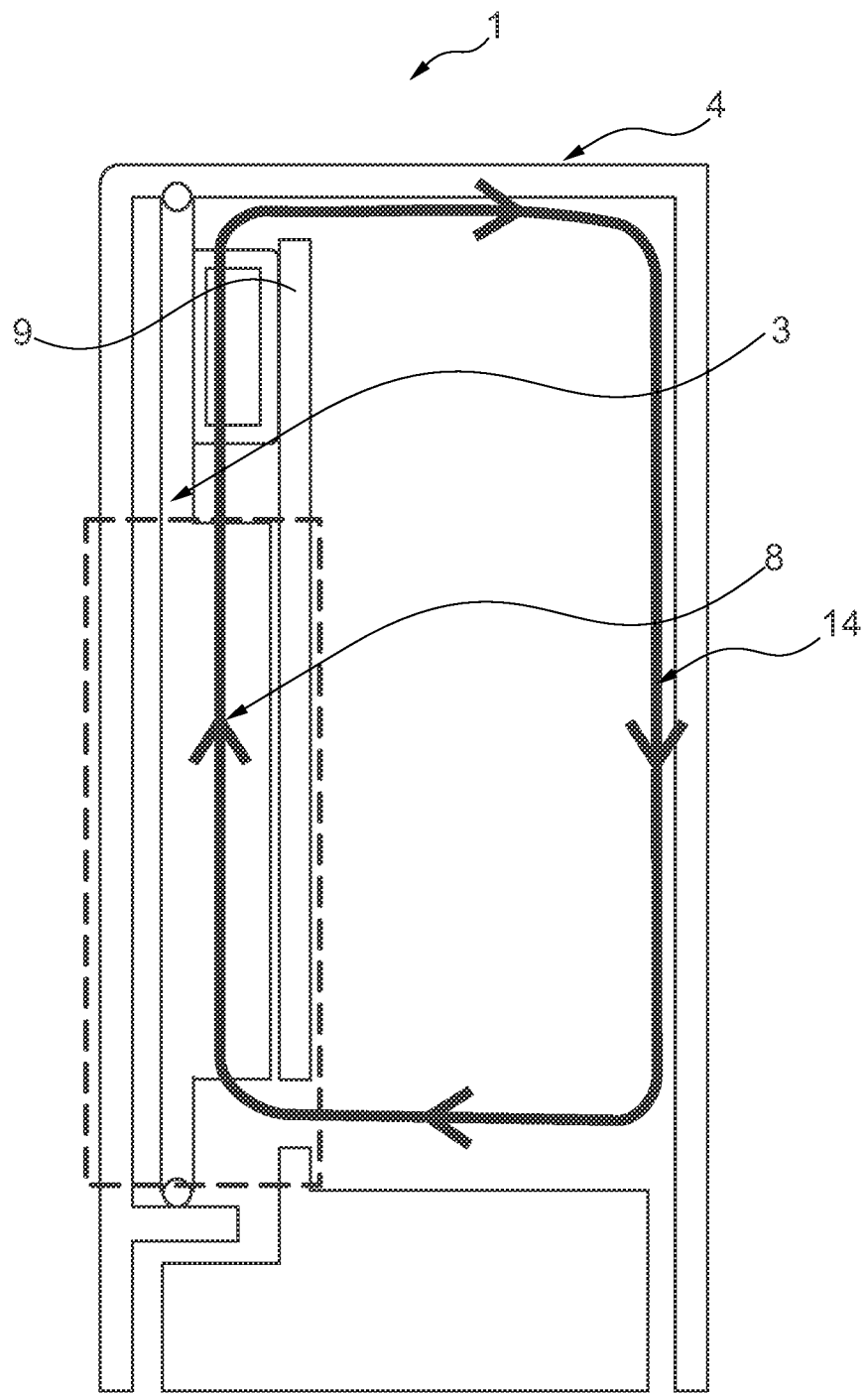
FIG. 6: a second example of a clutch.

FIG. 6 shows another example of a clutch 1, wherein elements which are the same as those in the first example are provided with the same reference labels. In this case, piston 3 and housing 4 rotate with an identical frequency of rotation only when in the engaged state. In the separated state of the clutch 1, and especially when engaging and disengaging, there are differences in speed of rotation between piston 3 and housing 4. This makes centrifugal oil pressure equalization necessary, since the different frequencies of rotation in the pressure chamber 7 and between piston 3 and component 9 result in different dynamic pressures. In this case, the region 8 is formed as in FIG. 3 or FIG. 4; that is, either the piston 3 or the component 9 has webs 10, which are oriented in the direction of the respective other element 9, 3 and form the oil chambers 11 described above. These have the same effect as described for the above example, and result in a centrifugal oil pressure equalization between the pressure chamber 7 and the region between the piston 3 and the component 9. At the same time, a conveying of the cooling medium in the wet chamber 15 occurs, which improves the cooling of the clutch 1.

This possible variant represents a modification of the intermeshing principle, which was described previously and which is easier to realize in terms of tolerance technology.

Figure 7:
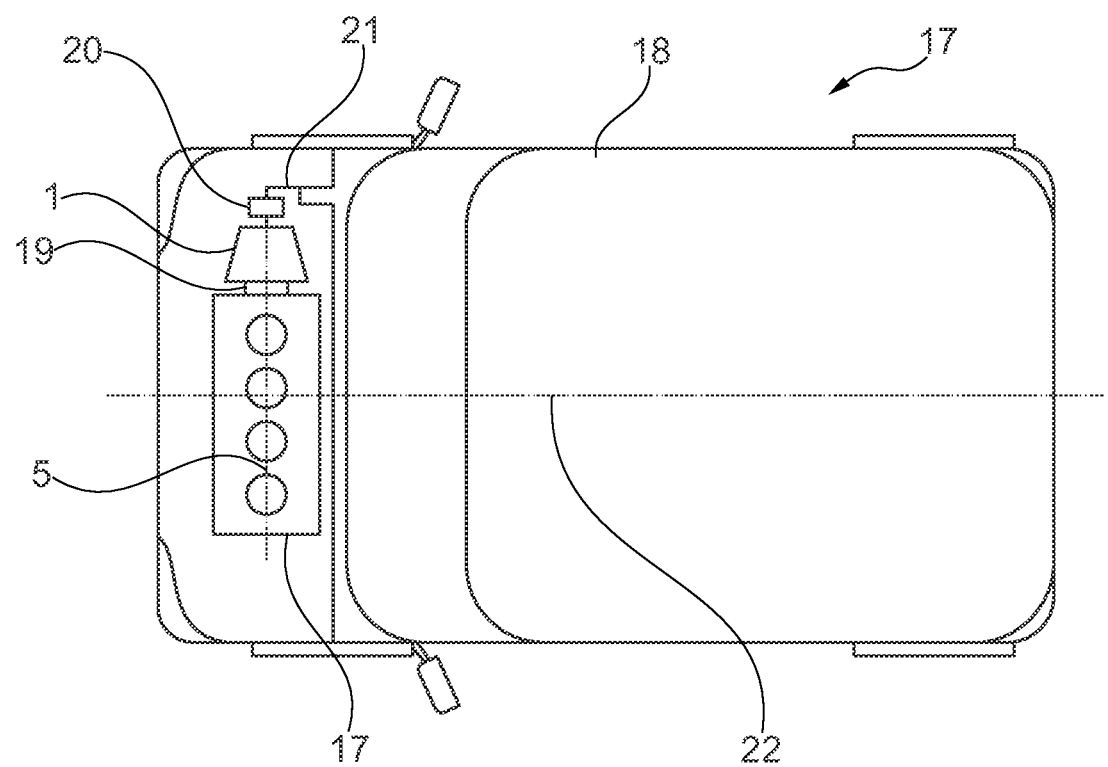
FIG. 7: an example of a corresponding motor vehicle.

FIG. 7 shows in a highly schematic form a motor vehicle 16, having a drive unit 17 which is formed in front of a driver's compartment 18. The drive unit 17 is, for example, an internal combustion engine, and is connected via an output shaft 19 to a clutch 1, as described above. In addition, the clutch 1 is connected to the drive shaft 20 of a drivetrain 21, and detachably transmits torque from the drive unit 17 to the drivetrain 21. The output shaft 19 and the drive shaft 20 rotate around the axis 5, which is laid out transversely to a longitudinal axis 22 of the motor vehicle 16.

REFERENCE LABELS 1 clutch
2 frictional element
3 piston
4 housing
5 axis
6 arrows
7 pressure chamber
8 region
9 component
10 web
11 oil chamber
12 circumferential direction
13 radial direction
14 global oil flow
15 wet chamber
16 motor vehicle
17 drive unit
18 driver's compartment
19 output shaft
20 drive shaft
21 drivetrain
22 longitudinal axis
23 gap

What is claimed is:

1. A clutch for transmitting torque from an input shaft to an output shaft, comprising:
    a wet chamber at least partially filled with a cooling medium;
    at least one piston; and
    a component located opposite the piston, the piston and the component rotatable around an axis, and the piston being movable in the direction of the axis to disengage and engage the clutch, on at least one of the piston and the component, on a side facing the other of the piston and the component, at least one web is formed, the web extending in the direction of the axis in the direction of the other of the piston and the component, a path of the web having at least one radial part in reference to the axis,
    wherein both the piston and the component each having at least one web overlapping each other in the axial direction.

2. The clutch as recited in claim 1 wherein the at least one web is designed so that a gap remains in the axial direction relative to the other of the piston and the component.

3. The clutch as recited in claim 1 wherein the clutch is configured so that the piston and the component are operated with an identical rotational frequency.

4. The clutch as recited in claim 1 wherein the clutch is configured so that the piston and the component are operable with a different speed of rotation.

5. The clutch as recited in claim 1 wherein the clutch is a motor vehicle clutch.

6. A motor vehicle comprising:
   a drive unit with a drive unit output shaft;
   a drivetrain; and
   a clutch as recited in claim 1 to detachably connect the drive unit output shaft with the drivetrain.

* * * * *